United States Patent Office 3,451,035
Patented June 17, 1969

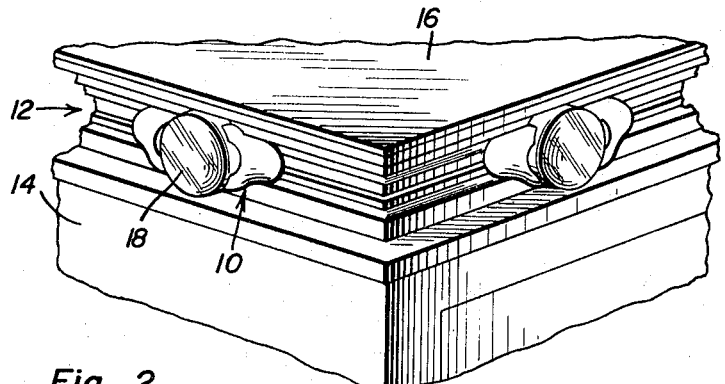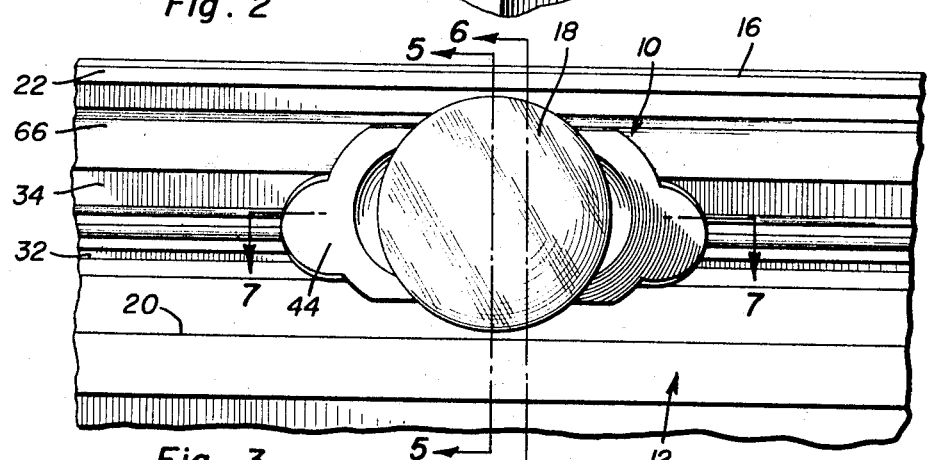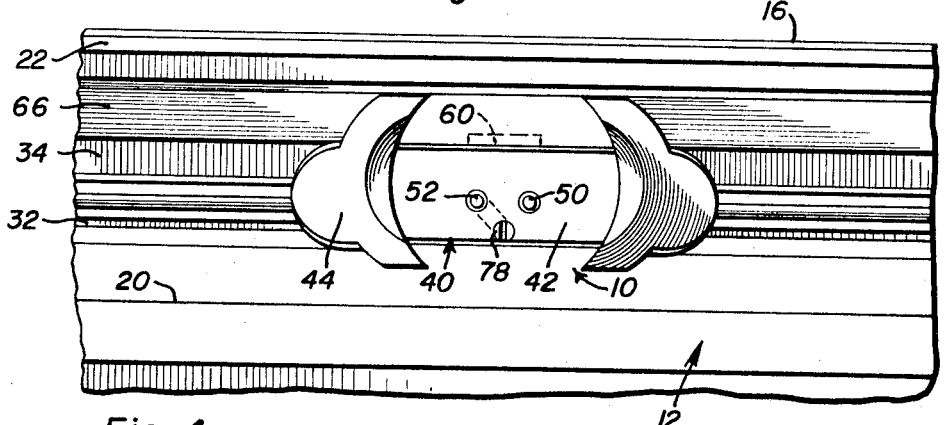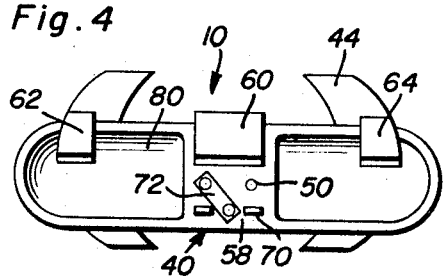
George D. Baldwin
INVENTOR.

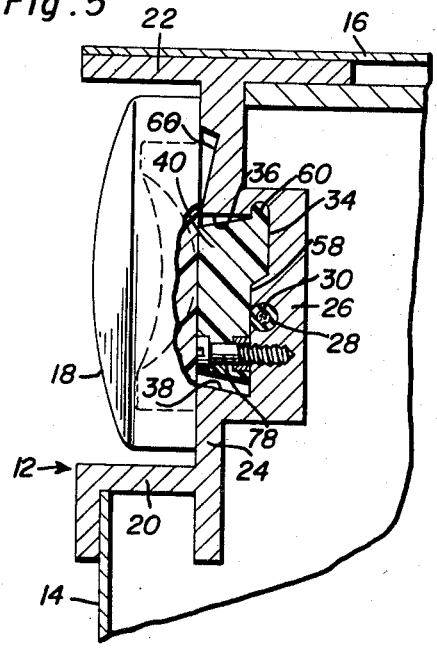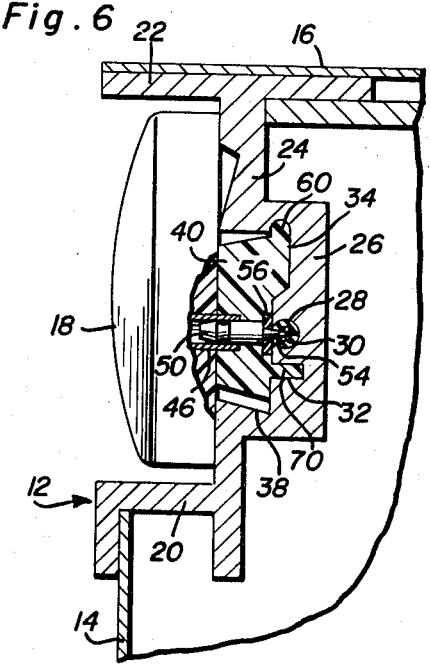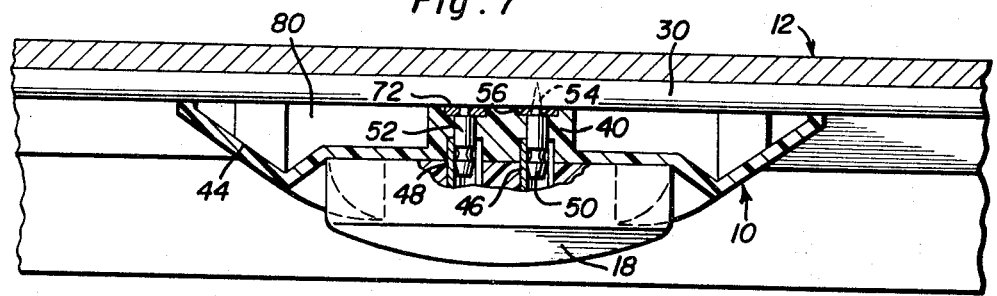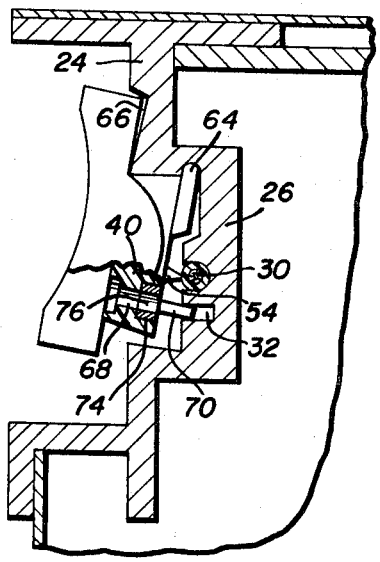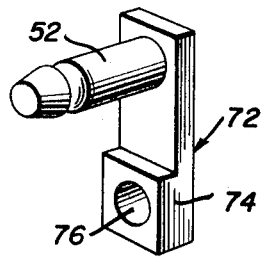
George D. Baldwin
INVENTOR.

3,451,035
RAIL MOUNTING BRACKET FOR
VEHICLE LAMPS
George D. Baldwin, Jamestown, N.Y., assignor to Truck-Lite Co., Inc., a corporation of New York
Continuation-in-part of application Ser. No. 342,695, Feb. 5, 1964. This application June 8, 1966, Ser. No. 556,200
Int. Cl. H01r 9/00, 11/20; B60q 1/32
U.S. Cl. 339—21
8 Claims

ABSTRACT OF THE DISCLOSURE

A lamp holder is mounted within the channel-shaped rail of a vehicle frame by insertion at any desired location and pivotal displacement into abutment with the web mounting surface of the rail. Pivotal displacement to a locked position is guided and causes piercing of a power supply cable by a connector prong. Ground is also established in the locked position between another connector and a groove in the mounting surface.

---

This invention relates to the mounting of lamps on extruded rails or channel members usually associated with trailer truck constructions having features in common with my prior copending, original application, U.S. Ser. No. 342,695, filed Feb. 5, 1964, now abandoned, with respect to which the present application is a continuation-in-part.

A primary object of the present invention is to provide a lamp holder capable of being mounted at any desired location within a mounting channel member in order to establish electrical power and ground connections with the lamp seated in the holder. Accordingly, the lamp-holder of the present invention is associated with a mounting channel member of the type within which an electrical power cable is supported.

Lamp holders capable of being received within an extruded aluminum channel member of the aforementioned type are well known as well as lamp holders which feature a power cable-piercing element through which an electrical connection is established between the power cable and the power terminal of the lamp received within the holder. However, in connection with such lamp installations, a serious problem arises with respect to establishing both a firm physical connection between the holder and the mounting channel member and protectively insulating the electrical connections against the adverse effects of weather on the metal surfaces adjacent to the lamp holder. The construction and arrangement of the lamp holder of the present invention is designed to cope with the aforementioned problems in a novel and successful manner.

It is therefore a further object of the present invention to provide a lamp holder and installational arrangement whereby a self-tapping screw establishes both a ground connection and a firm physical attachment of the lamp holder to the mounting channel at any desired location there along.

An additional object of the present invention in accordance with the foregoing objects, is to provide a lamp holder capable of being easily and rapidly installed at any desired location within a mounting channel member without any danger of improper installation.

Yet another object of the present invention is to provide a lamp holder of the aforementioned type having grease-retaining facilities accommodating the use of a non-conductive grease protectively coating the surface area within the channel member on which the lamp holder is mounted so as to avoid corrosion.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing typical vehicle lamp installations in accordance with the present invention.

FIGURE 2 is a front elevational view of one of the lamp installations shown in FIGURE 1.

FIGURE 3 is a front elevational view of the lamp installation shown in FIGURE 2 but with the lamp removed from the holder bracket.

FIGURE 4 is a rear elevational view of the lamp holder bracket itself.

FIGURE 5 is a transverse sectional view taken substantially through a plane indicated by section line 5—5 in FIGURE 2.

FIGURE 6 is a transverse sectional view taken substantially through a plane indicated by section line 6—6 in FIGURE 2.

FIGURE 7 is a longitudinal sectional view taken substantially through a plane indicated by section line 7—7 in FIGURE 2.

FIGURE 8 is a side elevational view of a lamp holder in the process being installed, with parts broken away and shown in section.

FIGURE 9 is a perspective view of the grounding connector assembly associated with the lamp holder.

Referring now to the drawings in detail, it will be observed from FIG. 1 that a pair of lamp holders 10 are operationally mounted within mounting channel members 12 from which the vertical walls 14 of a trailer truck extend and on which the roof panel 16 is usually supported. The lamp holder brackets 10 removably mount lamp devices 18 of any suitable type such as circular lamp devices disclosed in my prior Patent No. 3,089,951, issued May 14, 1963, having socket terminals projecting rearwardly therefrom. In accordance with the present invention, each of the lamp holder brackets 10 may be installed at any desired longitudinal location within the channel members.

Referring now to FIGS. 5 and 6 in particular, it will be observed that the channel member 12 includes a lower leg portion 20 to which the wall 14 is secured and an upper flange portion 22 to which the roof structure is connected. The lower leg portion 20 and upper flange portion 22 are interconnected by a web portion 24 formed with an intermediate recessed body portion 26. The recessed body portion 26 is formed with a longitudinal groove 28 within which an electrical power cable 30 is seated. A rectangular groove 32 is also formed within the recessed body portion 26 in parallel spaced relation below the groove 28. Also formed within the recessed body portion 26, is a longitudinal recess 34 which extends vertically beyond the horizontal side wall 36. The recessed body portion 26 is also connected to the web portion 24 of the channel member by a lower inclined wall surface 38. Thus, the lamp holder 10 is received between the upper wall surface 36 and the lower wall surface 38 in abutting relation to the recessed body portion 26 as shown in FIGS. 5 and 6. It will therefore be apparent, that the channel member 12 preferably made of extruded aluminum, is provided with the particular cross-sectional configuration described in order to receive a lamp holder bracket constructed in accordance with the present invention.

Referring now to FIGS. 3, 4, 5, 6 and 7, it will be observed that the lamp holder bracket 10 consists of a longitudinal body made of a non-conductive material having an intermediate body portion 40. Projecting from the outwardly facing side 42 of the holder body are a pair of longitudinally spaced lamp-engaging formations 44 adapted to hold the lamp device 18 therebetween in abutment with the intermediate body portion 40. The lamp device 18 is therefore of the type having a pair of socket terminals 46 and 48 which project rearwardly therefrom so that they may receive the prong-type of connectors 50 and 52 which project from the outward side 42 of the lamp holder body between the lamp-engaging formations 44, as more clearly seen in FIGS. 3 and 7.

The intermediate body portion 40 mounts the connectors 50 and 52 in alignment with the cable mounting groove 28. The connector 50 is provided with a cable-piercing element 54 which projects into the groove 38 so as to be embedded within the power cable 30. A non-conductive washer 56 is mounted in surrounding relation to the cable-piercing element 54 as shown in FIGS. 6 and 7 so as to insulate the power connector 50 from the recessed body portion 26 of the channel member when the rearwardly facing side 58 of the holder body is in abutment therewith as shown in FIGS. 5–7.

The holder as more clearly seen in FIG. 4, is provided with longitudinally spaced extensions 60, 62 and 64 which project laterally therefrom on the rearwardly facing side 58. The extensions are adapted to be received within the longitudinal recess 34 of the channel member so that the holder may be pivotally guided for movement into abutting relation with the recessed body portion 26 from the tilted position illustrated in FIG. 8. Accordingly, the web portion 24 of the channel member is also provided with a longitudinal recess 66 in order to initially receive the lamp-engaging formations 44 when the lamp holder is inserted in its tilted position. Pivotal displacement of the lamp holder from the position shown in FIG. 8 to the position shown in FIG. 6, will therefore cause the element 54 to pierce the power cable 30 in order to establish an electrical connection between the power cable and the power connector 50.

It will be observed from FIG. 8, that the intermediate portion 40 of the holder body is provided with a bore 68 adapted to be aligned with the groove 32 when the holder body is displaced to the position abutting the recessed body portion 26 of the channel member. In order to lock the holder body in the abutting position, and accurately align the bore 68 with the groove 32, a pair of locking tabs 70 are formed on the rear side 58 of the holder body longitudinally spaced on either side of the bore 68 so as to be received within the groove 32 as shown in FIG. 6.

Once the holder body is fully seated and locked within the channel member, it may then be firmly clamped to the channel member while at the same time a ground connection is established between the channel member and the ground connector 52. Toward this end, the ground connector 52 is secured to an electrically conductive element 72 having a thickened end portion 74 as shown in FIG. 9 through which an aperture 76 extends. The conductive element 72 is embedded within the intermediate body portion 40 and extends diagonally from a location between the locking tabs 70 and the connector 52 in order to align the connector 52 and the aperture 76 with the socket terminal 48 and the bore 68, respectively. A self-tapping screw 78 as shown in FIG. 5 may then be inserted through the bore 68 and aperture 76 for threaded engagement within the groove 32. Thus, the holder body may be firmly clamped by the self-tapping screw 78 to the channel member in order to obtain a firm physical attachment. At the same time, the screw 78 and the conductive element 72 will establish a good electrical ground connection between the channel member and the ground connector 52 to which the conductive element 72 is connected.

Also formed within the holder body on either side of the intermediate portion 40, are grease-retaining cavities or recesses 80 as shown in FIGS. 4 and 7. Thus, a supply of a non-conductive or silicon-type of grease will be available to coat the surfaces against which the holder body abuts in order to electrically insulate the connectors 50 and 52 as well as to protect the surrounding surface area against corrosion.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a conductive mounting surface having a pair of parallel spaced grooves and an insulated power cable seated in one of said grooves, a lamp holder comprising a body made of non-conductive material, said body having at least two lamp-engaging formations, a pair of connectors mounted by the body and projecting therefrom between said lamp-engaging formations, cable-piercing means connected to one of the connectors in alignment with said one of the grooves for projection into the power cable when the body is in abutting relation to the mounting surface, self-tapping screw means mounted by the body and projecting into the other of the grooves for clamping the body in abutting relation to the surface, and means electrically connecting the screw means to the other of the connectors for establishing a ground connection to the mounting surface.

2. The combination of claim 1 including a pair of locking tabs projecting from the body in alignment with the other of the grooves on either side of the screw means.

3. The combination of claim 2 including at least one pivot extension projecting laterally from the body, said mounting surface being provided with a longitudinal recess receiving said pivot extension.

4. The combination of claim 3 wherein said body is provided with grease-retaining recesses adjacent to the connectors.

5. The combination of claim 1 including at least one pivot extension projecting laterally from the body, said mounting surface being provided with a longitudinal recess receiving said pivot extension.

6. The combination of claim 1 wherein said body is provided with grease-retaining recesses adjacent to the connectors.

7. In combination with a lamp having a pair of terminals projecting therefrom, a lamp holder for mounting said lamp on a channel member having a pair of parallel spaced grooves and a longitudinal recess, said lamp holder comprising a body made of non-conductive material, said body having formations engaging said lamp and longitudinally spaced extensions adapted to be received within the longitudinal recess, a pair of connectors mounted by the body in engagement with the lamp terminals and adapted to be aligned with one of said grooves in the channel member, a cable-piercing element connected to one of the connectors and adapted to project into said one of the grooves, a conductive element connected to the other of the connectors having an aperture adapted to be aligned with the other of the grooves, a self-tapping screw mounted by the body and extending through said aperture for reception in the other of said grooves, and a locking tab projecting from the body for reception in said other of said grooves longitudinally spaced from the self-tapping screw.

8. In combination with a lamp having a pair of terminals projecting therefrom, a lamp holder for mounting said lamp or a channel member having a pair of parallel spaced grooves and a longitudinal recess, said lamp holder comprising a body made of non-conductive material, said body having formations engaging said lamp and longitudinally spaced extensions adapted to be mounted by the body in engagement with the lamp terminals and adapted to be aligned with one of said grooves in the channel member, a cable-piercing element connected to one of the connectors and adapted to project into said one of the grooves, a conductive element connected to the other of the connectors having an aperture adapted to be aligned with the other of the grooves, a self-tapping screw mounted by the body and extending through said aperture for reception in the other of said grooves, said body being provided with recesses adjacent to the connectors adapted to form cavities between the body and the channel member, and a non-conductive grease retained within said cavities for protectively insulating the channel member adjacent to the connectors and the self-tapping screw.

References Cited

UNITED STATES PATENTS

| | | | |
|---|---|---|---|
| 2,965,750 | 12/1960 | Baldwin | 240—8.2 |
| 3,187,172 | 6/1965 | Knapp et al. | 240—8.2 |
| 3,230,494 | 1/1966 | Tillinghast et al. | 339—97 |
| 3,321,731 | 5/1967 | Goldbaum | 339—21 |

RICHARD E. MOORE, *Primary Examiner.*

P. A. CLIFFORD, *Assistant Examiner.*

U.S. Cl. X.R.

240—8.2; 339—97